(12) United States Patent
Kennell et al.

(10) Patent No.: US 11,687,861 B1
(45) Date of Patent: Jun. 27, 2023

(54) MONITORING AND ANALYZING RISK DATA AND RISK DISPOSITIONS

(71) Applicant: Wells Fargo Bank, N.A., San Francisco, CA (US)

(72) Inventors: Terri C. Kennell, Jacksonville, FL (US); Danielle K. Moore, Charlotte, NC (US); Lea C. Faircloth, Huntersville, NC (US); Brian Carman, Fort Mill, SC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/385,511

(22) Filed: Jul. 26, 2021

Related U.S. Application Data

(63) Continuation of application No. 15/804,650, filed on Nov. 6, 2017, now Pat. No. 11,074,532.

(51) Int. Cl.
*G06Q 10/00* (2023.01)
*G06Q 10/0635* (2023.01)
(Continued)

(52) U.S. Cl.
CPC ......... *G06Q 10/0635* (2013.01); *G06F 16/90* (2019.01); *G06Q 10/06375* (2013.01); *G06Q 10/06395* (2013.01); *G06Q 40/08* (2013.01)

(58) Field of Classification Search
None
See application file for complete search history.

(56) References Cited

U.S. PATENT DOCUMENTS

| 7,873,567 | B2 | 1/2011 | Eder |
| 7,970,701 | B2 * | 6/2011 | Lewis ............ G06Q 20/3674 |
| | | | 705/38 |

(Continued)

FOREIGN PATENT DOCUMENTS

WO  2011133225 A2  10/2011

OTHER PUBLICATIONS

Dahmen, Rochelle, Implementing an Effective Denials Management Program, Apr. 7, 2016, Beckers Hosptial reveiw, https://www.beckershospitalreview.com/pdfs/April_30th_Saturday/1115_F_Dahmen_Denials%20Management%20Reducing%20and%20Eliminating%20Claim%20Denials%20Utilizing%20Best%20Practices.pdf, p. 1-47. (Year: 2016).*

(Continued)

*Primary Examiner* — Joseph M Waesco
(74) *Attorney, Agent, or Firm* — Shumaker & Sieffert, P.A.

(57) ABSTRACT

This disclosure describes techniques for analyzing operational data and applying one or more rule sets to identify issues and/or to determine whether action should be taken to prevent or mitigate a future risk event. In one example, this disclosure describes a method that includes receiving, by a computing system, risk data; generating, by the computing system and based on the risk data and a set of rules, an issue relating to an entity; outputting, by the computing system, a request; responsive to outputting the request, receiving, by the computing system, a response to the issue from the entity; storing, by the computing system, information about the response; receiving, by the computing system, information about a risk outcome associated with the issue; and modifying, by the computing system and based on at least one of the response and the information about the risk outcome, the set of rules.

14 Claims, 6 Drawing Sheets

(51) Int. Cl.
*G06Q 10/0639* (2023.01)
*G06Q 40/08* (2012.01)
*G06Q 10/0637* (2023.01)
*G06F 16/90* (2019.01)

(56) References Cited

U.S. PATENT DOCUMENTS

| | | | |
|---|---|---|---|
| 8,458,073 B2 | 6/2013 | Tanzillo et al. | |
| 10,692,033 B2* | 6/2020 | Barday | G06F 21/552 |
| 11,074,532 B1* | 7/2021 | Kennell | G06Q 40/08 |
| 2005/0228685 A1* | 10/2005 | Schuster | G06Q 10/0639 |
| | | | 705/317 |
| 2007/0087756 A1* | 4/2007 | Hoffberg | G06Q 10/103 |
| | | | 455/450 |
| 2008/0052137 A1* | 2/2008 | Ziade | G06Q 40/08 |
| | | | 705/4 |
| 2008/0140514 A1* | 6/2008 | Stenger | G06Q 10/06 |
| | | | 705/36 R |
| 2009/0125369 A1 | 5/2009 | Kloostra et al. | |
| 2009/0265199 A1 | 10/2009 | Moerdler et al. | |
| 2011/0035326 A1* | 2/2011 | Sholl | G06Q 10/06395 |
| | | | 705/317 |
| 2011/0046993 A1* | 2/2011 | Nielsen | G06Q 10/063 |
| | | | 705/7.17 |
| 2011/0093792 A1* | 4/2011 | Frayman | G06Q 50/18 |
| | | | 715/752 |
| 2011/0126111 A1* | 5/2011 | Gill | G06F 21/577 |
| | | | 715/736 |
| 2011/0213811 A1* | 9/2011 | Ziade | G06Q 40/00 |
| | | | 707/805 |
| 2011/0238452 A1* | 9/2011 | Ziade | G06Q 40/06 |
| | | | 705/4 |
| 2012/0011077 A1 | 1/2012 | Bhagat | |
| 2012/0143631 A1* | 6/2012 | Ziade | G06Q 40/08 |
| | | | 705/4 |
| 2012/0278737 A1* | 11/2012 | Frayman | G06Q 50/18 |
| | | | 715/753 |
| 2013/0346114 A1* | 12/2013 | Ziade | G06Q 40/08 |
| | | | 705/4 |
| 2014/0236656 A1* | 8/2014 | Nielsen | G06Q 10/0633 |
| | | | 705/7.17 |
| 2014/0297359 A1 | 10/2014 | Morinaga et al. | |
| 2014/0297495 A1* | 10/2014 | Dalal | G06Q 40/04 |
| | | | 705/37 |
| 2014/0330594 A1* | 11/2014 | Roberts | G06Q 40/08 |
| | | | 705/4 |
| 2015/0058260 A1 | 2/2015 | Mun | |
| 2015/0073956 A1 | 3/2015 | Mayenberger | |
| 2015/0170076 A1 | 6/2015 | Pawar et al. | |
| 2015/0227869 A1* | 8/2015 | Saraf | G06Q 10/0635 |
| | | | 705/7.28 |
| 2015/0281287 A1* | 10/2015 | Gill | G06F 21/55 |
| | | | 726/1 |
| 2016/0086184 A1* | 3/2016 | Carpenter | G06Q 20/322 |
| | | | 705/44 |
| 2016/0267082 A1* | 9/2016 | Wong | G06F 16/164 |
| 2016/0330219 A1* | 11/2016 | Hasan | G01C 21/387 |
| 2016/0371618 A1 | 12/2016 | Leidner et al. | |
| 2017/0032458 A1* | 2/2017 | Dembo | G06Q 40/02 |
| 2017/0053283 A1* | 2/2017 | Meng | G06Q 20/102 |
| 2017/0206365 A1* | 7/2017 | Garcia | G06F 21/604 |
| 2017/0206599 A1* | 7/2017 | Garcia | G06F 21/6245 |
| 2017/0270440 A1* | 9/2017 | Garcia | G06Q 10/0633 |
| 2017/0272452 A1* | 9/2017 | Kraemer | H04L 63/145 |
| 2017/0323231 A1* | 11/2017 | Johnson | G06Q 10/1093 |
| 2017/0323239 A1* | 11/2017 | Johnson | G06Q 10/06313 |
| 2018/0268090 A1* | 9/2018 | Ren | G05B 23/0297 |
| 2019/0325088 A1* | 10/2019 | Dubey | G06F 30/00 |
| 2019/0325628 A1* | 10/2019 | Dubey | G06N 20/00 |
| 2020/0118051 A1* | 4/2020 | Barday | G06F 21/6245 |

OTHER PUBLICATIONS

Blunden, "An Introduction to Operational Risk," accessed from http://www.chasecooper.com/pub-art-sub.html on or about Jun. 15, 2017, 10 pp.

"How to perform a financial institution risk assessment," Verafin, accessed from https://verafin.com/wp-content/uploads/2017/performing-enterprise-risk-assessment-EB-Verafin on or about Jun. 15, 2017, 15 pp.

Wackerbeck et al., "Stress testing: From regulatory burden to slialegic capability," Strategy&, Oct. 26, 2016, 11 pp.

Beach, Christopher, Unstructured data_ How to implement an early warning system for hidden risks, Jan. 1, 2014, Journal of Accountancy, https://www.journalofaccountancy.com/issues/2014/jan/20126972.html, p. 1-9. (Year: 2014).

Prosecution History from U.S. Appl. No. 15/804,650, dated Jun. 24, 2019, through Apr. 5, 2021, 145 pp.

\* cited by examiner

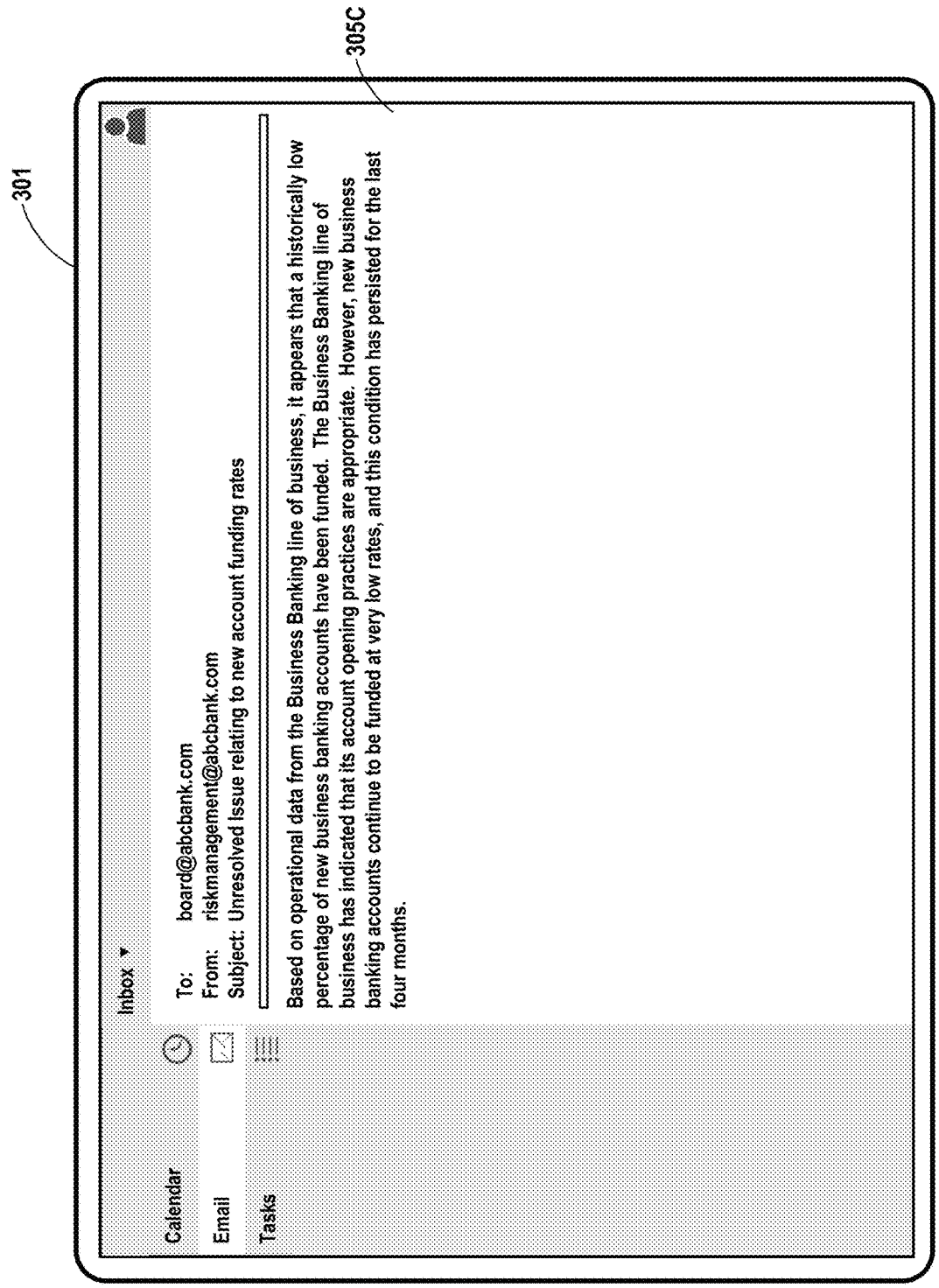

MONITORING AND ANALYZING RISK DATA AND RISK DISPOSITIONS

CROSS REFERENCE

This application is a continuation application of and claims priority to U.S. patent application Ser. No. 15/804,650 filed on Nov. 6, 2017, which is hereby incorporated by reference herein in its entirety.

TECHNICAL FIELD

This disclosure relates to analyzing data on a computer network, and more specifically, to analyzing risk data and storing information relating to risk issues and/or risk events.

BACKGROUND

For commercial financial institutions, risks are inevitable, since generating profits may require taking on risk. Financial institutions routinely face credit risk, market risk, and operational risk, to name a few examples. Credit risk is the risk that a financial institution's counter party will fail to meet its obligations (e.g., loan payments). Market risk involves the risk of loss stemming from movement in market prices for assets held by the financial institution. Operational risk is the risk of loss resulting from errors, external events, and/or inadequate or failed internal processes. For example, operational risks can result from incorrectly recorded financial information, computer programming errors, data breaches, and failures to identify or accurately assess liabilities of the financial institution.

A line of business within a bank, for example, may engage in conduct that might be characterized by the bank (or by a regulator) as "risk issue" or an "issue." In some cases, an issue may result in a risk event. A risk event, if it occurs, may have consequences to the bank ranging from damage to the bank's reputation to a complete financial collapse.

SUMMARY

This disclosure describes techniques for analyzing operational data and applying one or more rule sets to identify issues and/or to determine whether action should be taken to prevent or mitigate a future risk event. Techniques in accordance with one or more aspects of the present disclosure may enable greater accountability and transparency in how issues are addressed and dispositioned. Further, such techniques may enable rule sets for detecting risk issues to evolve, and thereby accurately identify issues and/or identify new types of issues.

In at least some applications of techniques described herein, a computing system may identify operational risk issues that may require action, and store information about those issues to a risk disposition database. Issues can be addressed and action may be taken by a line of business or other entity implicated by the issue. Dispositions of the issues may be recorded, and the system may later analyze the dispositions relative to operational risk outcomes. Based on such an analysis, changes to the rules can be made, enabling future risk events to be prevented or mitigated.

In one example, this disclosure describes a computing system comprising processing circuitry and a storage device, wherein the processing circuitry has access to the storage device and is configured to: receive risk data; generate, based on the risk data and a set of business operation rules applicable to an entity, an issue relating to a violation of the business operation rules by the entity; output, to an entity computing device controlled by the entity, a request for information about the issue that identifies the issue and requires a user of the entity computing device to respond to the issue through the user interface; responsive to outputting the request, receive information about the issue from the entity computing device; receive information about a risk outcome associated with the issue; and modify, based on the information about the issue from the entity computing device and the information about the risk outcome, the set of business operation rules to change circumstances in which the set of business operation rules identify issues.

In another example, this disclosure describes a method comprising: receiving, by a computing system, risk data; generating, by the computing system and based on the risk data and a set of business operation rules applicable to an entity, an issue relating to a violation of the business operation rules by the entity; outputting, by the computing system and to an entity computing device controlled by the entity, a request for information about the issue that identifies the issue and requires a user of the entity computing device to respond to the issue through the user interface; responsive to outputting the request, receiving, by the computing system, information about the issue from the entity computing device; receiving, by the computing system, information about a risk outcome associated with the issue; and modifying, by the computing system and based on the information about the issue from the entity computing device and the information about the risk outcome, the set of business operation rules to change circumstances in which the set of business operation rules identify issues.

In another example, this disclosure describes a computer-readable storage medium comprises instructions that, when executed, configure processing circuitry of a computing system to receive risk data; generate, based on the risk data and a set of business operation rules applicable to an entity, an issue relating to a violation of the business operation rules by the entity; output, to an entity computing device controlled by the entity, a request for information about the issue that identifies the issue and requires a user of the entity computing device to respond to the issue through the user interface; responsive to outputting the request, receive information about the issue from the entity computing device; receive information about a risk outcome associated with the issue; and modify, based on the information about the issue from the entity computing device and the information about the risk outcome, the set of business operation rules to change circumstances in which the set of business operation rules identify issues.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

FIG. 3A, FIG. 3B, and FIG. 3C are conceptual diagrams illustrating example user interfaces presented by a computing device in accordance with one or more aspects of the present disclosure.

DETAILED DESCRIPTION

Figure 1:
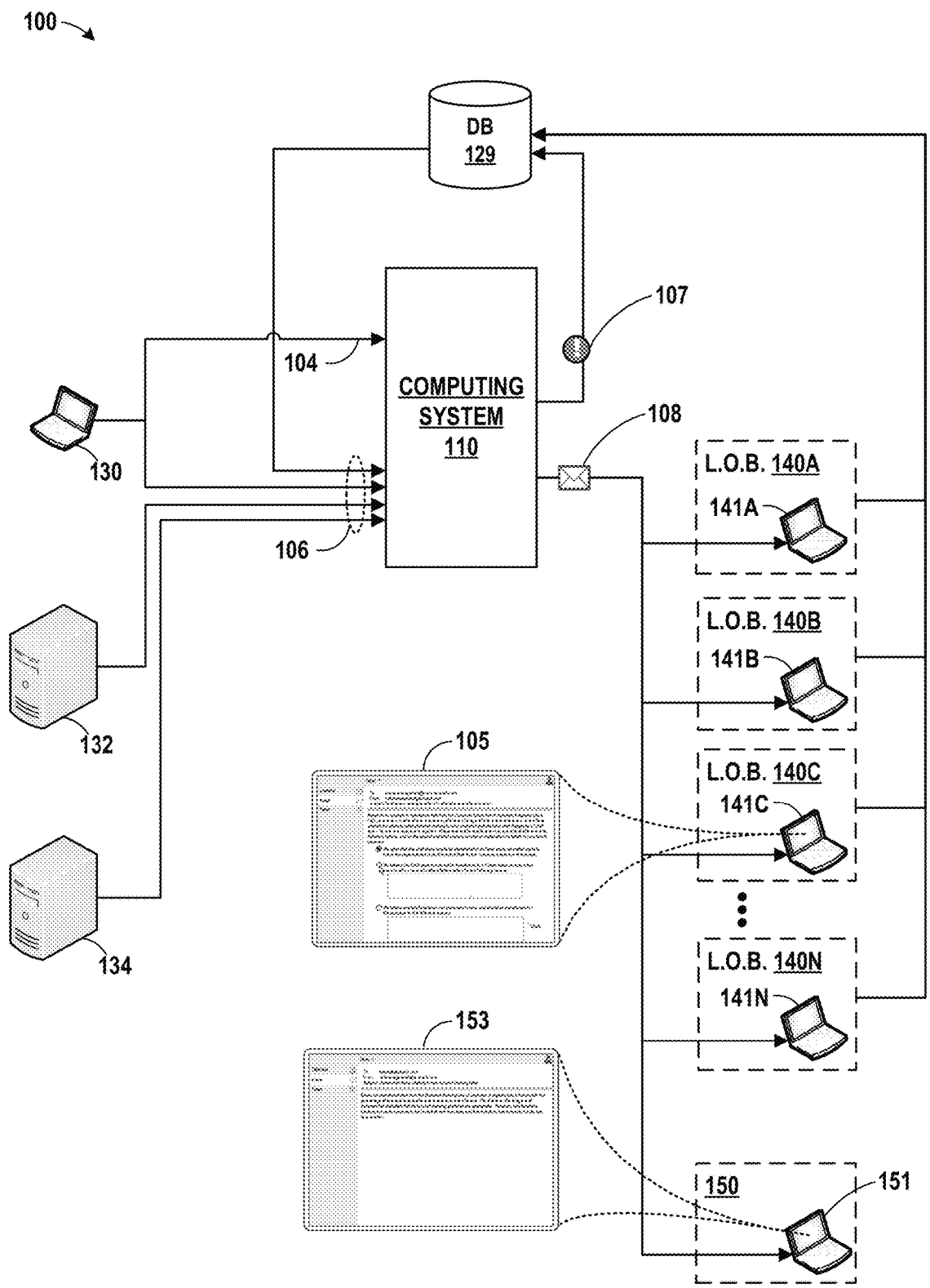
FIG. 1 is a conceptual diagram illustrating an example system for monitoring and analyzing risk data, risk dispositions, and/or risk outcomes, in accordance with one or more aspects of the present disclosure.

FIG. 1 is a conceptual diagram illustrating an example system for monitoring and analyzing risk data, risk dispositions, and/or risk outcomes, in accordance with one or more aspects of the present disclosure. The example of FIG. 1 illustrates system 100, which includes computing system 110 receiving data in the form of rules 104 and/or risk data 106 from one or more terminals 130, one or more internal computing systems 132, and one or more external computing systems 134. Computing system 110 may output information to disposition database 129, including one or more issues 107, and may also receive information from disposition database 129 in the form of risk data 106. Computing system 110 may output one or more notifications 108 to any of a number of computing devices, such computing device 141A, computing device 141B, computing device 141C, through computing device 141N (collectively "computing devices 141"). One or more of computing devices 141 may present one or more user interfaces 105 in accordance with one or more aspects of the present disclosure. Computing system 110 may also output one or more notifications 108 to computing device 151, which may present user interface 153.

In FIG. 1, and as described herein, each of computing devices 141 is included within a corresponding organization, entity, or line of business within an organization. Each such entity or line of business is represented by a dotted line box, such as line of business 140A, line of business 140B, line of business 140C, through line of business 140N (collectively "lines of business 140"). In the example of FIG. 1, each of the lines of business 140 are subsidiaries, affiliates, operating units, business units, or other units or entities of a larger enterprise or of a parent enterprise, which may be referred to herein as simply the "enterprise," or in some examples, as "ABC Bank." In examples described herein, each of computing devices 141 is assumed to be operated by or controlled by personnel associated with a respective line of business 140. For example, computing device 141A may be operated by personnel associated with, employed by, or authorized by line of business 140A. Similarly, computing device 141B may be operated by personnel associated with, employed by, or otherwise authorized by line of business 140B.

Also, computing device 151 may be operated by personnel associated with, employed by, or authorized by leadership team 150. Leadership team 150 may include one or more first level managers, one or more higher-level managers, a board of directors, and/or an executive team for the enterprise. In other examples, leadership team 150 may include one or more employees (e.g., "risk executives") of the enterprise that are charged with monitoring, preventing, and/or mitigating risk events associated with the enterprise. In still other examples, leadership team 150 may authorize other personnel, such as a contractor or non-employee representative of the enterprise, to operate computing device 151.

Terminal 130 is a computing device that may be operated by one or more users and/or employees of the enterprise, or by another person. One or more internal computing systems 132 may represent systems internal to the enterprise that generate risk data. In some examples, internal computing systems 132 may include one or more systems that track operational data, credit risk data, and/or information about specific entities within the enterprise, or specific lines of business within the enterprise. Such operational data may include specific to one or more lines of business. One or more external computing systems 134 may represent systems external to the enterprise that generate risk data for analysis by computing system 110. In some examples, external computing systems 134 may include systems that generate or collect information from news sources, social media sources, regulatory or governmental sources, information about regulatory events or calendar items, credit risk information, market risk information, competitor or competitive information, litigation risks, industry trends, and any other external information that may relate to operational data and/or risk data.

In the example of FIG. 1, and in accordance with one or more aspects of the present disclosure, computing system 110 may receive information (i.e., "rules 104") for interpreting operational and other data. For instance, in the example of FIG. 1, terminal 130 detects input and outputs information to computing system 110. Computing system 110 determines that the information corresponds to programming or other information, from terminal 130, that can be used for interpreting risk data 106. Computing system 110 stores the information as rules 104 for use in analyzing risk data 106. Alternatively, or in addition, computing system 110 detects input from one or more other computing devices within system 100. In one example, computing system 110 detects input that computing system 110 determines corresponds to information from disposition database 129. Computing system 110 generates, based on the information from disposition database 129, additional rules 104. Alternatively, or in addition, computing system 110 may automatically generate, based on an analysis of other data available to computing system 110, more additional rules 104. Computing system 110 may store these additional rules 104 in local storage for use in analyzing risk data 106.

Computing system 110 may receive risk data 106 from various sources. For instance, in the example of FIG. 1, computing system 110 detects input that computing system 110 determines corresponds to information from terminal 130, one or more internal computing systems 132, and/or one or more external computing systems 134. Computing system 110 further determines that the information corresponds to risk data 106. Alternatively, or in addition, computing system 110 may request risk data 106 from other computing systems. In such an example, computing system 110 may output a request to one or more of internal computing systems 132. Each such internal computing system 132 may, in response to receiving the request, access or generate information that internal computing system 132 outputs to computing system 110. Computing system 110 receives the information and determines that the information corresponds to risk data 106. In other examples, computing system 110 may issue a similar request to terminal 130 or one or more external computing systems 134, and in response, receive risk data 106. In general, risk data 106 may include operational data for a financial institution or bank, regulatory events data, information about events external to the financial institution or bank, news reports, social media information, and other information.

Computing system 110 may analyze risk data 106. For instance, in the example of FIG. 1, computing system 110 applies rules 104 to risk data 106 and performs an analysis. Based on the analysis, computing system 110 determines that one or more lines of business 140 may be operating in a manner that is inconsistent with proper business practices, management expectations or guidelines, regulatory or legal requirements or guidelines, and/or risk management practices. In some examples, an issue may apply to more than one line of business, so some issues may be applicable across multiple lines of business 140 (e.g., applicable to a bank's banking, consumer lending, wholesale businesses). Computing system 110 may have different sets of rules 104 that apply to specific lines of business 140, and other sets of rules that may apply to large subsets or all of lines of business 140. Accordingly, computing system 110 may apply certain rules 104 across all lines of business 140. Computing system 110 may apply other rules 104 across only a subset of lines of business 140. In some examples, computing system 110 may apply other rules 104 to only specific lines of business 140.

Accordingly, computing system 110 may analyze multiple data sets selected from risk data 106 and apply multiple rule sets in parallel, e.g., each of the data sets and rule sets for a different line of business or entity within the enterprise, which may be a larger financial institution or bank. For example, there may be different rule sets for sales practice analysis, mortgage analysis, and credit card analysis. Computing system 110 may perform the analysis using a single rules engine operating on multiple threads or by separate rules engines for each of lines of business 140. In some examples, separate rules engines may be implemented as pluggable modules that can be added to computing system 110 as needed.

Computing system 110 may identify a risk issue ("an issue") associated a specific line of business. For instance, in the example of FIG. 1, line of business 140C may be a business that issues credit cards to consumers and extends credit to consumers using those credit cards. Line of business 140C may generate revenue in a number of ways, including through interest paid on outstanding balances and through service fees. Line of business 140C may be subject to a management guideline, driven by regulatory requirements and reflected in one or more of rules 104, that limits fees charged to credit card customers. In the example of FIG. 1, computing system 110 determines, based on risk data 106 and stored rules 104, that line of business 140C is collecting fees for customers that exceeds the management guideline. Accordingly, computing system 110 identifies this as a potential business risk, since it represents an adverse gap or disconnect between actual performance or results of operations by line of business 140C and management or regulator expectations for line of business 140C has arisen. In response to this determination, computing system 110 performs one or more actions specified by the triggered rule 104. For example, computing system 110 generates issue 107 reflecting the gap or disconnect between the credit card fees being charged to customers by line of business 140C and the management expectations for such fees. Issue 107 may represent a business risk, since issue 107 may portend a regulatory punishment (i.e., a "risk event") based on a violation of regulatory requirements pertaining to credit card fees.

Computing system 110 may store information about issue 107 in disposition database 129. For instance, in the example of FIG. 1, computing system 110 outputs information about issue 107 to disposition database 129. In response, disposition database 129 logs information about issue 107.

Computing system 110 may send a notification to line of business 140C, as another example action specified by the triggered rule 104. For instance, in this example, computing system 110 outputs notification 108 to computing device 141C. Notification 108 includes information about issue 107. Computing device 141C is monitored by personnel within line of business 140C and/or is otherwise associated with line of business 140C. Accordingly, a user of computing device 141C may be a manager or other person authorized to respond to issue 107. Computing device 141C receives notification 108 and presents user interface 105 based on notification 108 at a display associated with computing device 141C. User interface 105 presents information about issue 107, and thereby informs a user of computing device 141C of issue 107.

User interface 105 may prompt the user of computing device 141C to respond to issue 107. For instance, in the example of FIG. 1, user interface 105 requests that a user of computing device 141C respond to a prompt within user interface 105 to "accept" issue 107, "deny" issue 107, or characterize issue 107 as "resolved." The way line of business 140C responds to issue 107 (e.g., through a user of computing device 141C authorized to respond on behalf of line of business 140C) may be considered a "disposition" of issue 107. Line of business 140C may "accept" an issue when an authorized user of computing device 141C acknowledges that for a particular issue, an adverse gap or disconnect exists between its performance or results and expectations. Line of business 140C may "deny" an issue when an authorized user of computing device 141C does not believe that an adverse gap or disconnect exists between performance or results and expectations. Line of business 140C may characterize issue 107 as "resolved" if an authorized user of computing device 141C acknowledges that an issue may have previously existed, but that the issue has since been resolved. Line of business 140C may also characterize issue 107 as "resolved" if an authorized user acknowledges that an issue currently exists, but the issue will nevertheless be resolved without further action.

Until accepted or closed by the applicable line of business 140, issue 107 may be considered a "draft" issue. Once accepted by line of business 140C, issue 107 may be considered an "open" or "live" issue. In the example of FIG. 1, if line of business 140C characterizes issue 107 as denied or resolved, issue 107 may be considered a "closed" issue. In other examples, some issues may be initially considered "open" issues without requiring acceptance by a line of business, such as where the severity of the potential risk event associated with issue is high. Further, some issues may be initially considered open issues in other situations, such as if the issue is raised in response to regulatory requirements.

Computing system 110 may send additional notifications to line of business 140C. For instance, in the example of FIG. 1, computing system 110 determines that computing device 141C has not detected a response to the prompt included within user interface 105. Computing system 110 sends one or more additional notifications 108 to computing device 141C. Computing device 141C receives such additional notifications 108 and presents one or more user interfaces 105 based on such additional notifications 108. Such user interfaces 105 may remind a user of computing device 141C to respond to issue 107.

Computing system 110 may determine that line of business 140C has accepted issue 107. For instance, in the example of FIG. 1, computing device 141C eventually detects input that computing device 141C interprets as a response, by a user of computing device 141C, to issue 107. Computing device 141C outputs information to disposition database 129. Disposition database 129 detects the information and determines that the information corresponds to an acceptance of issue 107 by line of business 140C. Disposition database 129 stores information about the acceptance of issue 107 by line of business 140C (e.g., as a "disposition" of issue 107). Disposition database 129 outputs to computing system 110 information about the acceptance of issue 107 by line of business 140C. Computing system 110 receives the information and determines that line of business 140 has accepted issue 107.

Computing system 110 may guide line of business 140C through resolution of issue 107 by issuing a corrective plan or an action plan to line of business 140C. For instance, in the example of FIG. 1, computing system 110 accesses or generates an action plan to help line of business 140C resolve issue 107. Computing system 110 outputs to computing device 141C information about the action plan. Computing device 141C detects information about the action plan and presents one or more user interfaces 105 providing guidance about how to resolve issue 107. In some examples, where an issue is applicable to more than one line of business, different plans might apply to each line of business and different timelines may be used by such plans. Further, for an issue that applies to more than one line of business, some lines of business may consider the issue to be more severe or significant than other lines of business.

Computing system 110 may determine that line of business 140C is making progress toward resolving issue 107. For instance, in the example of FIG. 1, computing device 141C periodically detects input and outputs to disposition database 129 information about the input. Disposition database 129 determines that the input corresponds to information about steps taken by line of business 140C to resolve issue 107. Disposition database 129 logs the information about the steps taken by line of business 140C. Disposition database 129 outputs to computing system 110 information about the steps taken by line of business 140C. Computing system 110 analyzes recent risk data 106 to determine whether there has been an identifiable improvement or resolution of issue 107.

Computing system 110 may determine that issue 107 has been resolved. For instance, in the example of FIG. 1, computing system 110 determines that, based on recent risk data 106, issue 107 has been resolved and that issue 107 should be considered closed. Computing system 110 outputs to disposition database 129 information about issue 107. Disposition database 129 receives the information and stores information indicating issue 107 is closed and/or resolved.

Computing system 110 may notify line of business 140C that issue 107 has been closed. For instance, in the example of FIG. 1, computing system 110 outputs to computing device 141C information about issue 107. Computing device 141C receives the information and presents one or more user interfaces 105, informing a user of computing device 141C that issue 107 has been resolved.

In an alternative example, computing system 110 may determine that after attempting to guide line of business 140C through resolution of issue 107, issue 107 has nevertheless not been resolved. For instance, in such an alternative example, computing system 110 determines, based on recent risk data 106 and/or information stored in disposition database 129, that line of business 140C is no longer progressing towards resolving issue 107. Computing system 110 outputs information to computing device 151 information about issue 107. Computing device 151 receives the information and uses the information to generate data associated with a user interface. Computing device 151 presents user interface 153 based on the data, informing a user of computing device 151 (e.g., a member of leadership team 150) that line of business 140C has not resolved issue 107. Computing device 151 may, in response, detect input that computing device 151 (or computing system 110) determines corresponds to a request to escalate issue 107 in some way. Alternatively, or in addition, computing device 151 may detect input that computing device 151 (or computing system 110) determines corresponds to other steps taken in an attempt to ensure that issue 107 is resolved satisfactorily.

Computing system 110 may evaluate the disposition of issue 107 at a time when a risk outcome is known. For instance, in the example of FIG. 1, computing system 110 detects input that computing system 110 determines corresponds to information about an operational risk outcome for issue 107. Computing system 110 may receive input in the form of risk data 106 or in another form, including in response to research independently and/or periodically undertaken by computing system 110. The operational risk outcome may arise weeks, months, or years after issue 107 was generated. Computing system 110 determines, based on the risk outcome information, that a risk event relating to issue 107 did eventually occur. In response, computing system 110 modifies one or more rules 104 and/or the types of risk data 106 to which computing system 110 applies rules 104 so that when risk data 106 exhibits characteristics or attributes similar to that which caused the risk event relating to issue 107, appropriate remediation steps can be taken to prevent the occurrence of another risk event. For example, computing system 110 may modify a threshold associated with one or more rules, such as by giving the threshold a more stringent value. As another example, computing system 110 may modify the actions associated with one or more rules, such as by requiring additional notifications to trigger additional oversight of issue disposition.

In another example, computing system 110 may determine that a risk event relating to issue 107 did not or has not yet occurred. In such an example, computing system 110 may determine that no modifications should to be made to any rules 104 that may apply in circumstances similar to those that gave rise to issue 107. Computing system 110 may also determine that rules 104 are overly risk-sensitive, and that issue 107 should not been identified. In such an example, computing system 110 may reduce the sensitivity of rules 104 so that an issue is less likely to be raised in similar circumstances. Alternatively, or in addition, computing system 110 may reduce, narrow, or otherwise modify risk data 106 considered by computing system 110 when identifying issue 107, so that an issue is less likely to be raised in similar circumstances.

Accordingly, computing system 110 may periodically evaluate, based input available to computing system 110, information relating to risk events for historical issues to determine the efficacy of the rules 104 applied by computing system 110. Similarly, computing system 110 may periodically evaluate such information to determine the efficacy of any plans in place for resolving issues for each of line of business. In some examples, computing system 110 may include a disposition analyzer that can analyze the dispositions and issues relative to risk outcomes or operational risk outcomes and identify modifications that could or should be made to the rules. Computing system 110 may update rules 104 accordingly. In some examples, computing system 110 may identify an aggregate impact of risk data, issues, and/or related dispositions, and identify cross-over issues that impact multiple businesses.

In some examples, computing system 110 may provide reporting information for one or more identified issues. For instance, computing system 110 may output reporting information and/or trend information about issue 107. In some examples, computing system 110 may provide risk issue reporting in a dashboard format, accessible by terminal 130, computing device 151, or another computing device. A user of such a computing device may be able to view, address, or evaluate issues, dispositions of issues, or other information by viewing and/or interacting with such a dashboard. The dashboard may present a list of issues segregated by status (open, closed), risk level, amount of time taken to resolve and/or whether such time frames are appropriate for risk level. Some information output by computing system 110 may be fed back into computing system 110 as new risk data 106 to be analyzed, or as new rules 104 or updates to existing rules. Such new rules 104 may, for example, be based on outcomes of prior analysis of dispositions stored in disposition database 129 by computing system 110. New rules 104 and/or new or updated rules 104 may be generated in a near or seemingly-near real time.

FIG. 1 illustrates one example implementation of system 100. Other example or alternative implementations of system 100 may be appropriate in other instances. Such implementations may include a subset of the devices and/or components included in the example of FIG. 1 and/or may include additional devices and/or components not shown in FIG. 1. Accordingly, although one or more implementations of system 100 have been described with reference to FIG. 1, system 100 may be implemented in a number of different ways.

For instance, one or more devices of system 100 that may be illustrated as separate devices may alternatively be implemented as a single device; one or more components of system 100 that may be illustrated as separate components may alternatively be implemented as a single component. Also, in some examples, one or more devices of system 100 that may be illustrated as a single device may alternatively be implemented as multiple devices; one or more components of system 100 that may be illustrated as a single component may alternatively be implemented as multiple components. Each of the multiple devices and/or components may be directly coupled via wired or wireless communication and/or remotely coupled via one or more networks. Also, one or more devices or components that may be illustrated in FIG. 1 may alternatively be implemented as part of another device or component not shown in FIG. 1.

Further, certain operations, techniques, features, and/or functions may be described herein as being performed by specific components, devices, and/or modules in FIG. 1. In other examples, such operations, techniques, features, and/or functions may be performed by different components, devices, or modules. Accordingly, some operations, techniques, features, and/or functions that may be described herein as being attributed to one or more components, devices, or modules in FIG. 1 may, in other examples, be attributed to other components, devices, and/or modules, even if not specifically described herein in such a manner.

Through techniques in accordance with one or more aspects of the present disclosure, such as analyzing operational data to automatically identify issues that could lead to risk events, system 100 may accurately detect issues based on risk data. By accurately detecting issues based on risk data, system 100 may process less user input because if issues are accurately detected based on risk data, less manual research will be needed to identify issues, and since such research involves user input, less user input will be required. Therefore, aspects of this disclosure may improve the function of system 100 because analyzing operational data to identify issues may have the effect of causing system 100 to process less user input, thereby potentially conserving computing power.

By sending notifications to lines of business and requiring a response, system 100 may provide transparency and accountability for how issues are addressed. By providing transparency and accountability, system 100 may avoid having to perform significant processing operations because with greater transparency, the circumstances that cause a risk event will be apparent, and less post-risk event research will be needed to determine the cause of a risk event. Since such research involves significant processing operations, those operations will be avoided. Therefore, aspects of this disclosure may improve the function of system 100 because sending notifications to lines of business and requiring a response may have the effect of causing system 100 to avoid having to perform significant processing operations.

By verifying that a risk issue is being resolved, computing system 110 may be able to identify improvements to plans for guiding lines of business through resolving issues. By improving such plans, computing system 110 may adapt to more accurately respond to issues that subsequently arise. Therefore, aspects of this disclosure may improve the function of computing system 110 because verifying that risk issues are being resolved may have the effect of more accurately responding to issues that arise.

By adjusting rules for issues that are denied by a line of business, system 100 may ensure that issues are not raised by computing system 110 inappropriately. By avoiding raising issues inappropriately (e.g., "false issues"), computing system 110 may avoid unproductive processing operations that occur when false issues are identified. Therefore, aspects of this disclosure may improve the function of computing system 110 because adjusting rules for issues that are denied by a line of business may have the effect of causing computing system 110 to avoiding unproductive processing.

Further, by not identifying false issues, system 100 may perform fewer unproductive processing operations and thereby consume less electrical power, because unproductive processing operations consume electrical power. Therefore, aspects of this disclosure may improve the function of system 100 because adjusting rules for issues that are denied by a line of business may have the effect of causing system 100 to consume less electrical power.

Figure 2:
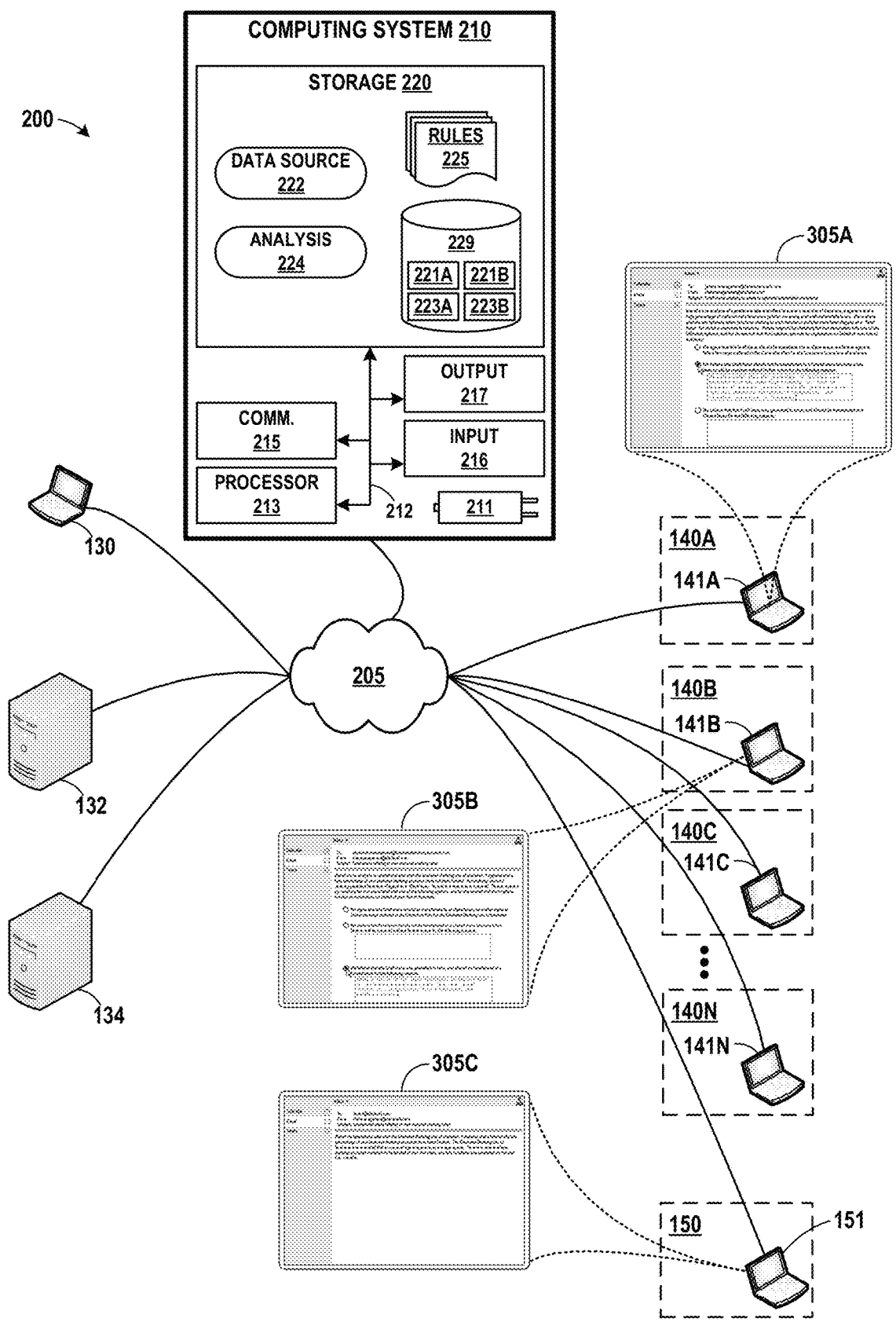
FIG. 2 is a block diagram illustrating an example system for monitoring and analyzing risk data, risk dispositions, and/or risk outcomes, in accordance with one or more aspects of the present disclosure.

FIG. 2 is a block diagram illustrating an example system for monitoring and analyzing risk data, risk dispositions, and/or risk outcomes, in accordance with one or more aspects of the present disclosure. System 200 of FIG. 2 may be described as an example or alternative implementation of system 100 of FIG. 1.

In the example of FIG. 2, system 200 includes network 205, computing system 210, one or more terminals 130, one or more internal computing systems 132, one or more external computing systems 134, and computing devices 141 interconnected by network 205. In FIG. 2, computing system 210 may generally correspond to a system that combines, includes, and/or implements aspects of the functionality of computing system 110 and disposition database 129 of FIG. 1. For ease of illustration, only one computing system 210 is illustrated in FIG. 2, although techniques in accordance with one or more aspects of the present disclosure may be performed with many more of such systems.

Also, in FIG. 2, terminals 130, internal computing systems 132, and computing devices 141 may correspond to terminals 130, 132, and computing devices 141 of FIG. 1, respectively. These devices, systems, and/or components may be implemented in a manner consistent with the description of the corresponding system provided in connection with FIG. 1, although in some examples such systems may involve alternative implementations with more, fewer, and/or different capabilities. In general, systems, devices, components, and entities (e.g., lines of business 140) illustrated in FIG. 2 may correspond to like-numbered systems, devices, components, and entities illustrated in FIG. 1, and may be described in a manner consistent with the description provided in connection with FIG. 1.

Network 205 may be the internet, or may include or represent any public or private communications network or other network. For instance, network 205 may be a cellular, Wi-Fi®, ZigBee, Bluetooth, Near-Field Communication (NFC), satellite, enterprise, service provider, and/or other type of network enabling transfer of transmitting data between computing systems, servers, and computing devices. One or more of client devices, server devices, or other devices may transmit and receive data, commands, control signals, and/or other information across network 205 using any suitable communication techniques. Network 205 may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems). Each of the devices or systems illustrated in FIG. 2 may be operatively coupled to network 205 using one or more network links. The links coupling such devices or systems to network 205 may be Ethernet, Asynchronous Transfer Mode (ATM) or other types of network connections, and such connections may be wireless and/or wired connections. One or more of the devices or systems illustrated in FIG. 2 or otherwise on network 205 may be in a remote location relative to one or more other illustrated devices or systems.

Computing system 210 may be implemented as any suitable computing machine, such as one or more server computers, workstations, mainframes, appliances, cloud computing systems, and/or other computing systems that may be capable of performing operations and/or functions described in accordance with one or more aspects of the present disclosure. In some examples, computing system 210 represents a cloud computing system, server farm, and/or server cluster (or portion thereof) that provides services to client devices and other devices or systems. In other examples, computing system 210 may represent or be implemented through one or more virtualized compute instances (e.g., virtual machines, containers) of a data center, cloud computing system, server farm, and/or server cluster.

In the example of FIG. 2, computing system 210 may include power source 211, one or more processors 213, one or more communication units 215, one or more input devices 216, one or more output devices 217, and one or more storage devices 220. Storage devices 220 may include data source module 222, analysis module 224, rule sets 225, and disposition data store 229. Included within disposition data store 229 may be issue 221A, explanation 223A, issue 221B, and explanation 223B. One or more of the devices, modules, storage areas, or other components of computing system 210 may be interconnected to enable inter-component communications (physically, communicatively, and/or operatively). In some examples, such connectivity may be provided by through communication channels (e.g., communication channels 212), a system bus, a network connection, an inter-process communication data structure, or any other method for communicating data.

Power source 211 may provide power to one or more components of computing system 210. Power source 211 may receive power from the primary alternating current (AC) power supply in a building, home, or other location. In other examples, power source 211 may be a battery or a device that supplies direct current (DC). In still further examples, computing system 210 and/or power source 211 may receive power from another source. One or more of the devices or components illustrated within computing system 210 may be connected to power source 211, and/or may receive power from power source 211. Power source 211 may have intelligent power management or consumption capabilities, and such features may be controlled, accessed, or adjusted by one or more modules of computing system 210 and/or by one or more processors 213 to intelligently consume, allocate, supply, or otherwise manage power.

One or more processors 213 of computing system 210 may implement functionality and/or execute instructions associated with computing system 210 or associated with one or more modules illustrated herein and/or described below. One or more processors 213 may be, may be part of, and/or may include processing circuitry that performs operations in accordance with one or more aspects of the present disclosure. Examples of processors 213 include microprocessors, application processors, display controllers, auxiliary processors, one or more sensor hubs, and any other hardware configured to function as a processor, a processing unit, or a processing device. Central monitoring system 210 may use one or more processors 213 to perform operations in accordance with one or more aspects of the present disclosure using software, hardware, firmware, or a mixture of hardware, software, and firmware residing in and/or executing at computing system 210.

One or more communication units 215 of computing system 210 may communicate with devices external to computing system 210 by transmitting and/or receiving data, and may operate, in some respects, as both an input device and an output device. In some examples, communication unit 215 may communicate with other devices over a network. In other examples, communication units 215 may send and/or receive radio signals on a radio network such as a cellular radio network. In other examples, communication units 215 of computing system 210 may transmit and/or receive satellite signals on a satellite network such as a Global Positioning System (GPS) network. Examples of communication units 215 include a network interface card (e.g. such as an Ethernet card), an optical transceiver, a radio frequency transceiver, a GPS receiver, or any other type of device that can send and/or receive information. Other examples of communication units 215 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 216 may represent any input devices of computing system 210 not otherwise separately described herein. One or more input devices 216 may generate, receive, and/or process input from any type of device capable of detecting input from a human or machine. For example, one or more input devices 216 may generate, receive, and/or process input in the form of electrical, physical, audio, image, and/or visual input (e.g., peripheral device, keyboard, microphone, camera).

One or more output devices 217 may represent any output devices of computing system 210 not otherwise separately described herein. One or more output devices 217 may generate, receive, and/or process input from any type of device capable of detecting input from a human or machine. For example, one or more output devices 217 may generate, receive, and/or process output in the form of electrical and/or physical output (e.g., peripheral device, actuator). Some devices may serve as both input and output devices. For example, a communication device may both send and receive data to and from other systems or devices over a network.

One or more storage devices 220 within computing system 210 may store information for processing during operation of computing system 210. Storage devices 220 may store program instructions and/or data associated with one or more of the modules described in accordance with one or more aspects of this disclosure. One or more processors 213 and one or more storage devices 220 may provide an operating environment or platform for such modules, which may be implemented as software, but may in some examples include any combination of hardware, firmware, and software. One or more processors 213 may execute instructions and one or more storage devices 220 may store instructions and/or data of one or more modules. The combination of processors 213 and storage devices 220 may retrieve, store, and/or execute the instructions and/or data of one or more applications, modules, or software. Processors 213 and/or storage devices 220 may also be operably coupled to one or more other software and/or hardware components, including, but not limited to, one or more of the components of computing system 210 and/or one or more devices or systems illustrated as being connected to computing system 210.

In some examples, one or more storage devices 220 are temporary memories, meaning that a primary purpose of the one or more storage devices is not long-term storage. Storage devices 220 of computing system 210 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 220, in some examples, also include one or more computer-readable storage media. Storage devices 220 may be configured to store larger amounts of information than volatile memory. Storage devices 220 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories.

Data source module 222 may perform functions relating to detecting risk data 106 from one or more from one or more of terminal 130, internal computing systems 132, and/or external computing systems 134. Data source module 222 may detect input that data source module 222 determines corresponds to risk data 106 from one or more of terminal 130, internal computing systems 132, and/or external computing systems 134. Data source module 222 may output to analysis module 224 information about the risk data. Data source module 222 may receive input that data source module 222 determines corresponds to information about a risk outcome, which may relate to a previously-detected risk issue or issue. Data source module 222 may independently research information available over network 205 to determine or generate risk data 106. In doing so, data source module 222 may perform an internet search based to identify information relating to competing enterprises or risk events faced by competing enterprises. Also, n performing such research, data source module 222 may access a variety of information sources (e.g., either stored locally or remote to computing system 210). Data source module 222 may interact with and/or operate in conjunction with one or more modules of computing system 210.

Analysis module 224 may perform functions relating to monitoring, analyzing, and/or acting on risk data, information about risk dispositions, and risk outcomes. Analysis module 224 may apply one or more rule sets 225 to generate one or more issues and/or draft issues, which may apply to one or more specific lines of business within an enterprise. As just a few examples, such issues may relate to compliance with regulations relating to credit card fees, internal or external guidelines relating to disclosure requirements for various lines of business, and internal or external guidelines relating to sales practices for various lines of business. Such issues may also relate to data breaches and practices for preventing such breaches, mortgage servicing, fair lending practices and redlining, other regulatory requirements, and other business processes. In some examples, issues may relate to a product rather than policy and procedure.

Analysis module 224 may store information about issues in disposition data store 229 and analyze information stored within disposition data store 229. Analysis module 224 may cause communication unit 215 to output, over network 205, information about issues and/or notifications about issues. Analysis module 224 may receive and analyze information about dispositions and risk outcomes, and based on such information, modify or adjust one or more rule sets 225. Analysis module 224 may receive information from one or more other modules, and may output information to one or more other modules.

Although analysis module 224 may be described in connection with FIG. 2 as primarily analyzing risk data, analysis module 224 may, in addition, perform other tasks. For instance, analysis module 224 may generate information underlying user interfaces, perform research, and maintain disposition data store 229. Analysis module 224 may apply a stress test or "what-if" scenario function to risk data to determine what may occur if certain aspects of future risk data get worse. For example, if an event is generated because a risk data for a data metric has fallen below a management or regulatory guideline of 80%, analysis module 224 may predict what may happen if that metric falls below 70% in response to receiving input requesting the prediction. Analysis module 224 may assign a severity level to the situation, output alerts, and/or make recommendations based on the results of such a stress test. Further, analysis module 224 may, when new regulations are promulgated by government regulatory agencies, automatically generate new test rules for inclusion within rule sets 225 for those lines of business 140 implicated by the new regulations. Analysis module 224 may perform stress tests using current or legacy risk data, and may later update rule sets 225 with the new test rules. Further, analysis module 224 may provide an ability to identify correlated risk factors from multiple sources, and enable a systematic approach to learning from past risk situations to improve future outcomes. Analysis module 224 may allow risk events to be identified proactively rather than reactively, and provide a mechanism for evaluating disposition of risk events to improve the system's effectiveness going forward.

One or more rule sets 225 may include information derived from data received in communications with one or more terminals 130 and/or based on analyses performed by analysis module 224. Rule sets 225 may be created, maintained, adjusted, or updated by analysis module 224. Analysis module 224 applies rule sets 225 when analyzing risk data 106. Rule sets 225 may correspond to some aspects of rules 104 as described in connection with FIG. 1. Rule sets 225 may include rules such as "if funding rates decrease by greater than 5% in time period X, trigger an issue, review, and/or response." Such a rule would identify a situation where accounts are being opened, but funding rates are not increasing commensurately as would be expected. The rule may, in some examples, be configured to identify conditions and trigger corresponding actions in situations when sales practices should be evaluated and/or reviewed.

Disposition data store 229 may represent any suitable data structure or storage medium for storing information related to risk issues (e.g., issue 221A and issue 221B), dispositions and explanations (e.g., explanation 223A and explanation 223B), risk outcomes, and related information. The information stored in disposition data store 229 may be searchable and/or categorized such that one or more modules within computing system 210 may provide an input requesting information from disposition data store 229, and in response to the input, receive information stored within disposition data store 229. Disposition data store 229 may be primarily maintained by analysis module 224. Disposition data store 229 may receive from data source module 222 and/or analysis module 224 information about risk outcomes and dispositions. Disposition data store 229 may provide other modules with access to the data stored within disposition data store 229, and/or may analyze the data stored within disposition data store 229 and output such information on behalf of other modules of computing system 210.

Modules illustrated in FIG. 2 (e.g., data source module 222 and analysis module 224) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, rule sets, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, rule set, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

FIG. 2 illustrates one example implementation of system 200. Other example or alternative implementations of system 200 may be appropriate in other instances. Such implementations may include a subset of the devices and/or components included in the example of FIG. 2 and/or may include additional devices and/or components not shown in FIG. 2. Accordingly, although one or more implementations of system 200 of FIG. 2 are described, system 200 may be implemented in a number of other ways.

For instance, one or more devices of system 200 that are illustrated as separate devices may be implemented as a single device; one or more components of system 200 that are illustrated as separate components may be implemented as a single component. Also, in some examples, one or more devices of system 200 that are illustrated as a single device may be implemented as multiple devices; one or more components of system 200 that are illustrated as a single component may be implemented as multiple components. Each of the multiple devices and/or components may be directly coupled via wired or wireless communication and/or remotely coupled via one or more networks. Also, one or more devices or components illustrated in FIG. 2 may also be implemented as part of another device or component not shown in FIG. 2. In this and other ways, some of the functions described herein may be performed via distributed processing by two or more devices.

Further, certain operations, techniques, features, and/or functions are described herein as being performed by specific components, devices, and/or modules in FIG. 2. In other examples, such operations, techniques, features, and/or functions may be performed by different components, devices, or modules. Accordingly, some operations, techniques, features, and/or functions described herein as being attributed to one or more components, devices, or modules in FIG. 2 may, in other examples, be attributed to other components, devices, and/or modules, even if not specifically described herein in such a manner.

Figure 3A:
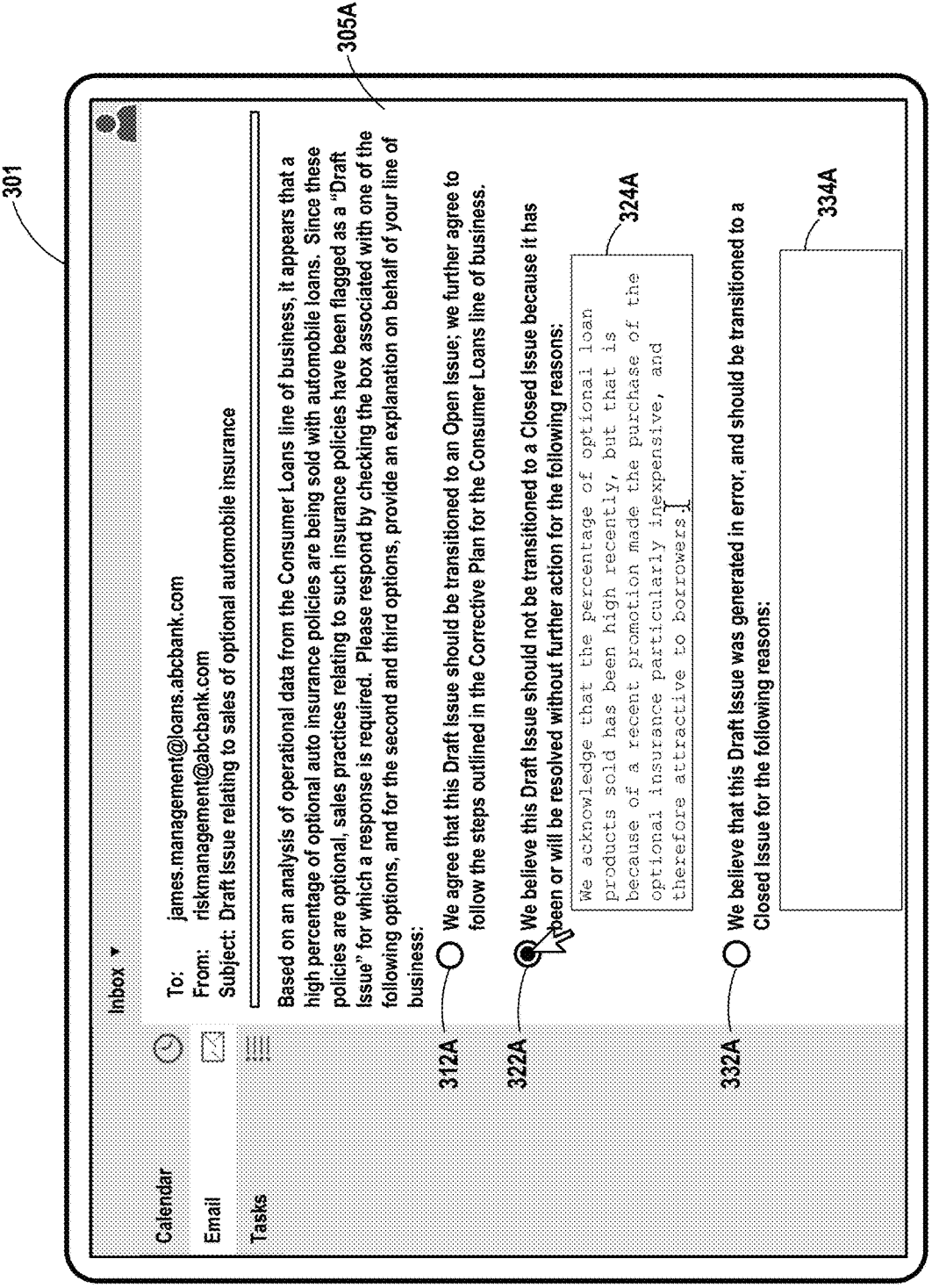
Figure 3B:
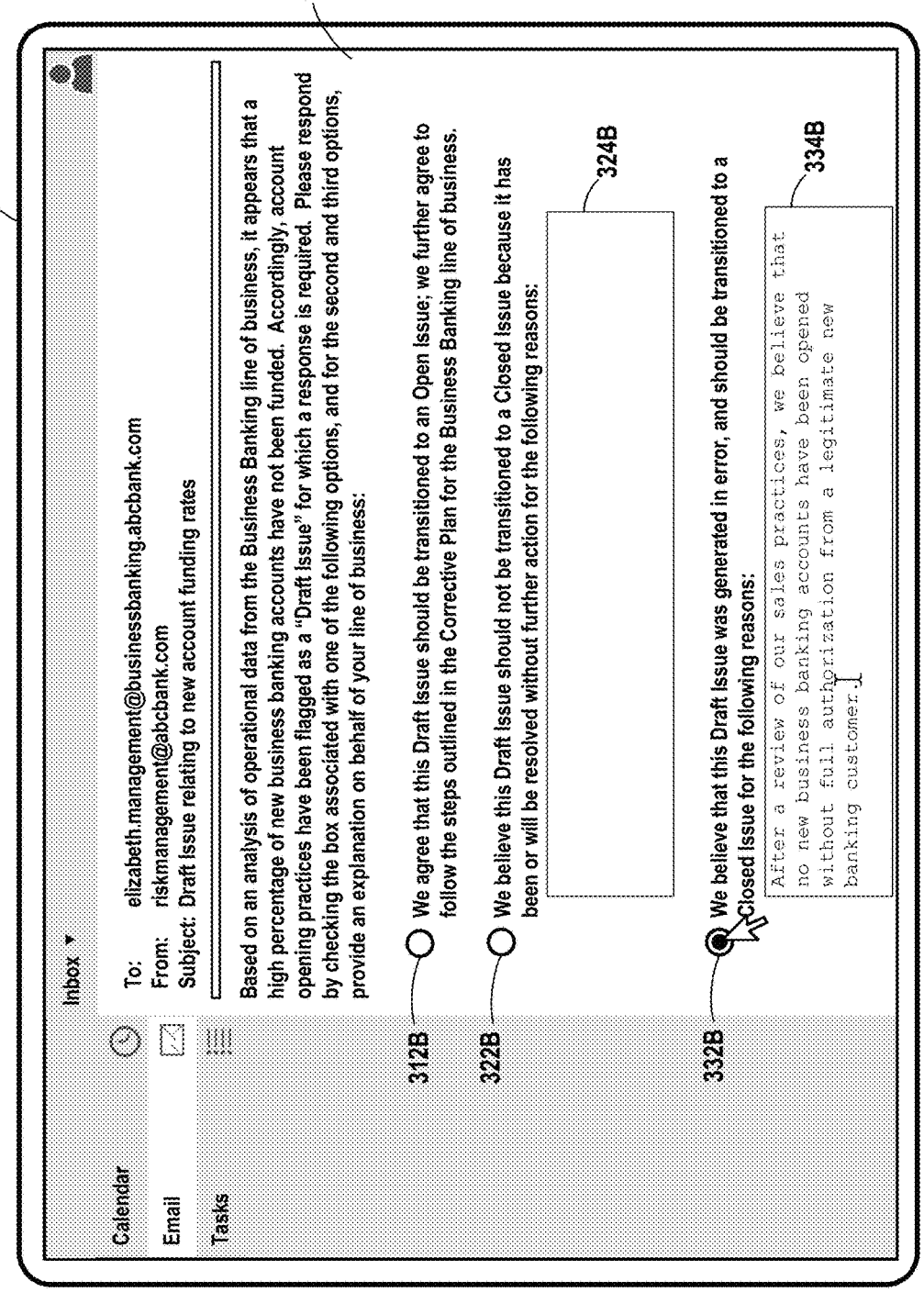

FIG. 3A, FIG. 3B, and FIG. 3C are conceptual diagrams illustrating example user interfaces presented by a computing device in accordance with one or more aspects of the present disclosure. User interface 305A and user interface 305B as illustrated in FIG. 3A and FIG. 3B, respectively, may correspond to a user interface presented by one or more of computing devices 141 of FIG. 2. User interface 305C as illustrated in FIG. 3C may correspond to a user interface presented by computing device 151 of FIG. 2.

Although the user interfaces illustrated in FIG. 3A, FIG. 3B, and FIG. 3C are shown as graphical user interfaces, other types of interfaces may be used or presented in other examples, including a text-based user interface, a console or command-based user interface, a voice prompt user interface, or any other appropriate user interface.

In an example that can be described within the context of FIG. 2 and FIG. 3A, and in accordance with one or more aspects of the present disclosure, computing system 210 may generate a draft issue. For instance, with reference to FIG. 2, communication unit 215 detects input over network 205 and outputs to data source module 222 an indication of input. Data source module 222 determines that the input corresponds to risk data from one or more of terminal 130, internal computing systems 132, and/or external computing systems 134. Data source module 222 outputs to analysis module 224 information about the input. Analysis module 224 generates, based on applying one or more rule sets 225 to the input, issue 221A. Issue 221A may relate to one or more of lines of business 140. Analysis module 224 stores information about issue 221A in disposition data store 229.

Analysis module 224 may determine that issue 221A applies to a specific business practice associated with line of business 140A. For instance, continuing with the same example, analysis module 224 determines that line of business 140A, which may be a line of business relating to consumer loans, sells an optional insurance product in connection with automobile loans originated by line of business 140A. Analysis module 224 further determines that in the last month, line of business 140A sold the optional auto insurance product with 90% of the automobile loans originated by line of business 140A. Analysis module 224 also determines, based on an analysis of rule sets 225, that a management guideline included within one or more rule sets 225 states that sales rates for the optional insurance product should be below 70%. This guideline might reflect research suggesting that for rates above 70%, the optional insurance product may be being sold without sufficient disclosure to borrowers. In other words, according to the described guideline embodied in rule sets 225, if the optional insurance product is being sold with a high percentage of automobile loans, the borrowers might be purchasing the optional insurance product without knowing that the purchase is not a required condition for obtaining the loan. Accordingly, since analysis module 224 has determined that the percentage of loans originated in the last month that also included the insurance product (90%) is higher than the guideline (70%) set forth by one or more rules of rule sets 225, analysis module 224 generates issue 221A. In some examples, analysis module 224 may generate issue 221A as a draft issue directed at or aligned with line of business 140A.

Computing system 210 may prompt personnel within line of business 140A for a response to issue 221A, as indicated by the one or more rules of rule sets 225. For instance, still referring to FIG. 2, analysis module 224 causes communication unit 215 to output a signal over network 205. Computing device 141A receives a signal over network 205 and determines that the signal includes data sufficient to present a user interface. Computing device 141A outputs user interface 305A at display 301 of computing device 141A as illustrated in FIG. 3A.

FIG. 3A illustrates an example email referring to a "Draft Issue" (i.e., corresponding to issue 221A) and prompting a user of computing device 141A for a response. In the example of FIG. 3A, the email is addressed to a person designated to respond to Draft Issues on behalf of line of business 140A. User interface 305A prompts the user of computing device 141A to select one of three radio buttons (accept button 312A, resolved button 322A, or deny button 332A). In user interface 305A, if either resolved button 322A or deny button 332A is selected, the reader is also prompted to provide an explanation or rationale for the selected response on behalf of line of business 140A.

Computing system 210 may log a response to the prompt presented by user interface 305A. For instance, referring to both FIG. 2 and FIG. 3A, computing device 141A detects input that computing device 141A determines corresponds to selection of resolved button 322A and text provided within explanation box 324A. Computing device 141A outputs a signal over network 205. Communication unit 215 detects a signal over network 205 and outputs to analysis module 224 information about the signal. Analysis module 224 determines that the signal indicates that a user operating computing device 141A has responded to the prompt within user interface 305A by stating that the Draft Issue should be transitioned to a Closed Issue state, because the issue has been or will be resolved without further action (i.e., corresponding to selection of resolved button 322A within user interface 305A). Analysis module 224 outputs to disposition data store 229 explanation 223A, which includes information reflecting the response from the user of computing device 141A on behalf of line of business 140A, and is derived from the information provided in explanation box 324A. Disposition data store 229 stores the explanation 223A in disposition data store 229, creating a record of the stated position of line of business 140A with respect to issue 221A.

Computing system 210 may verify that issue 221 has been resolved. For instance, in this example, data source module 222 continues to receive new risk data from various sources after storing explanation 223A. Data source module 222 outputs to analysis module 224 information about the new risk data. Analysis module 224 analyzes the new risk data to determine whether issue 221A has been resolved. Analysis module 224 determines, based on its analysis of the new risk data, that the percentage of loans originated that are accompanied with a sale of the optional insurance product have fallen below the management guideline of 70%. Analysis module 224 thereby verifies that issue 221A has been resolved. Analysis module 224 stores information reflecting confirmation of the resolution of issue 107 in disposition data store 229.

Computing system 210 may confirm to line of business 140A that issue 107 has been resolved. For instance, still referring to FIG. 2, analysis module 224 causes communication unit 215 to output a signal over network 205. Computing device 141A receives a signal over network 205 and determines that the signal includes data sufficient to present a user interface. Computing device 141A outputs a user interface at display 301 of computing device 141A indicating issue 221A has been resolved, and thereby informing a user of computing device 141A that issue 221A has been resolved.

Computing system 210 may adjust one or more rule sets 225 to prevent issue 221A from being generated again in similar circumstances. In some examples, computing system 210 adjusts the one or more rule sets 225 to modify a value of a threshold set forth by a rule in rule sets 225. For instance, again referring to FIG. 2, analysis module 224 analyzes issue 221A, explanation 223B, and information about the resolution of issue 221A (e.g., stored in disposition data store 229), and determines that information about promotions relating to the optional automobile insurance policies affects buying preferences and rates. Specifically, analysis module 224 determines that rule set 225 should be adjusted to reflect that when a promotion makes the optional automobile insurance policies sufficiently inexpensive, borrowers are much more likely to purchase the optional insurance. Accordingly, analysis module 224 determines that when a promotion affecting the price of the optional insurance product is in effect, the management guideline that triggers a draft issue based on sales of the optional insurance policy should be increased from 70% to 95%. Analysis module 224 adjusts one or more rule sets 225 to reflect this change in the rules that triggered issue 221A.

In a different example that can be described within the context of FIG. 2 and FIG. 3B, computing system 210 may generate a draft issue relating to another line of business. For instance, with reference to FIG. 2, communication unit 215 detects input over network 205 and outputs to data source module 222 an indication of input. Data source module 222 determines that the input corresponds to risk data from one or more of terminal 130, internal computing systems 132, and/or external computing systems 134. Data source module 222 outputs to analysis module 224 information about the input, and analysis module 224 generates, based on applying one or more rule sets 225 to the input, draft issue 221B. Analysis module 224 stores information about issue 221B in disposition data store 229.

Analysis module 224 may determine that issue 221B applies to a business practice associated with line of business 140B. For instance, in this example, analysis module 224 determines that line of business 140B, which may pertain to business banking, has opened a large number of business bank accounts in the last three months. Analysis module 224 further determines that in that time frame, only 50% of those new bank accounts have been funded. Still further, analysis module 224 applies one or more rules to the data, where such rules reflect a management guideline suggesting that when fewer than 75% of new business banking accounts are being funded over a given time period, there is a significant chance such new account openings are being driven by inappropriate sales practices. In some cases, low funding rates might suggest that accounts are being opened by sales agents without the full approval of a legitimate new banking customer. Accordingly, since analysis module 224 has determined that the percentage of the accounts funded for new accounts in the last three months (50%) is lower than the management guideline (75%), analysis module 224 generates issue 221B.

Computing system 210 may prompt personnel within line of business 140B for a response to issue 221B. For instance, again with reference to FIG. 2, analysis module 224 causes communication unit 215 to output a signal over network 205. Computing device 141B receives a signal and outputs user interface 305B at display 301 of computing device 141B as illustrated in FIG. 3B.

FIG. 3B illustrates an email referring to a "Draft Issue" (i.e., corresponding to issue 221B) and prompting a user of computing device 141B for a response. In the example of FIG. 3B, the email is addressed to a person designated to respond to Draft Issues on behalf of line of business 140B (i.e., elizabeth.management@businessbanking.abcbank.com). As in FIG. 3A, user interface 305B prompts the user of computing device 141B to select one of three radio buttons, and provide an explanation or rationale for the selected response on behalf of line of business 140B.

Computing system 210 may log a response to the prompt presented by user interface 305B. For instance, with reference to FIG. 2 and FIG. 3B, computing device 141B detects input that computing device 141B determines corresponds to selection of deny button 332B and text within explanation box 334B. Computing device 141B outputs a signal over network 205. Communication unit 215 detects a signal over network 205 and outputs to analysis module 224 information about the signal. Analysis module 224 determines that the signal indicates that a user operating computing device 141B has responded to the prompt within user interface 305B by stating that the Draft Issue should not have been generated, and that no new business banking accounts have been opened without authorization. Analysis module 224 outputs to disposition data store 229 explanation 223B, which includes information reflecting the response from the user of computing device 141B on behalf of line of business 140B. Disposition data store 229 stores explanation 223B in disposition data store 229, creating a record of the stated position of line of business 140B with respect to issue 221B.

Computing system 210 may continue to monitor issue 221B. For instance, data source module 222 continues to receive new risk data from various sources after storing explanation 223B. Data source module 222 outputs to analysis module 224 information about the new risk data. Analysis module 224 analyzes the new risk data to determine whether issue 221B has been resolved. Analysis module 224 determines, based on its analysis of the new risk data, that a high percentage of business bank accounts opened by line of business 140B continue to be opened without funding.

Computing system 210 may escalate issue 221B. For instance, still referring to FIG. 2, analysis module 224 causes communication unit 215 to output a signal over network 205. Computing device 151 receives a signal over network 205. Computing device 151 outputs, based on the signal, user interface 305C at display 301 of computing device 151 as illustrated in FIG. 3C.

FIG. 3C illustrates an example email describing issue 221B and indicating that issue 221B was not resolved. In the example of FIG. 3C, the email may be addressed to one or more members of a leadership team associated with ABC Bank. User interface 305C provides information about the status of issue 221B, and is presented at computing device 151, which may be a computing device monitored by one or more members of leadership team 150. Accordingly, user interface 305C may inform one or more members of leadership team 150 that issue 221B was not resolved. One or more members of leadership team 150 may undertake further investigation to either confirm that sales practices within line of business 140B are appropriate and that issue 221B was appropriately closed. Alternatively, or in addition, one or more members of leadership team 150 may identify and carry out any appropriate modifications to rule sets 225, identify any appropriate modifications to the sales practices adhered to by line of business 140B, and/or take other action.

Figure 4:
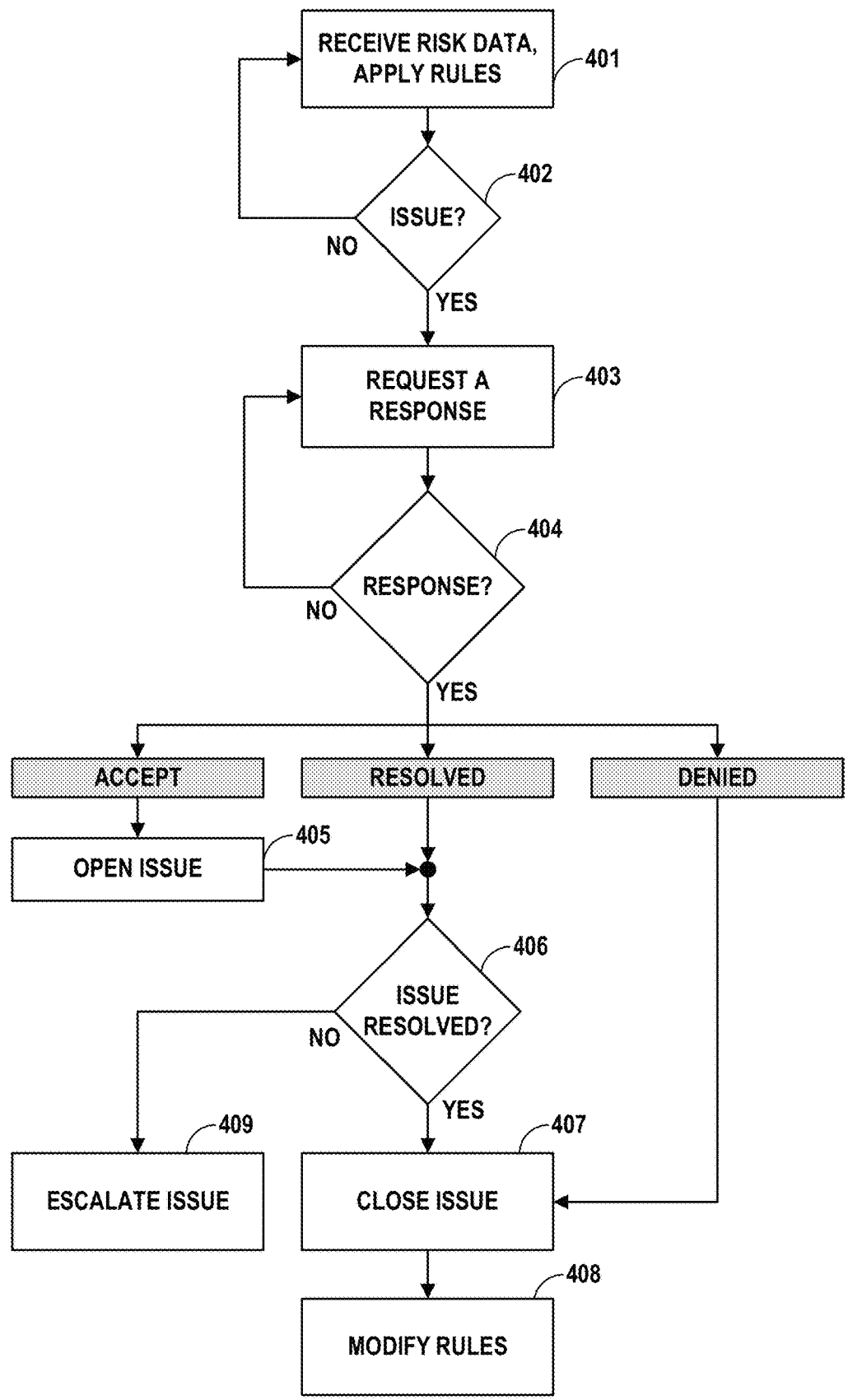
FIG. 4 is a flow diagram illustrating operations performed by an example computing system in accordance with one or more aspects of the present disclosure.

FIG. 4 is a flow diagram illustrating operations performed by an example computing system in accordance with one or more aspects of the present disclosure. FIG. 4 is described below within the context of computing system 210 of FIG. 2. In other examples, operations described in FIG. 4 may be performed by one or more other components, modules, systems, or devices. Further, in other examples, operations described in connection with FIG. 4 may be merged, performed in a difference sequence, or omitted.

In the example of FIG. 4, and in accordance with one or more aspects of the present disclosure, system 200 may receive risk data and apply rules to the risk data (401). For example, with reference to FIG. 2, communication unit 215 of computing system 210 may detect input over network 205. Data source module 222 may determine that the input corresponds to risk data. Data source module 222 may output to analysis module 224 information about the risk data. Analysis module 224 may analyze the risk data by applying rule sets 225 to the risk data.

Computing system 210 may generate, based on the risk data and a set of rules, an issue (402). For example, in response to analyzing the risk data, analysis module 224 determines, based on application of the rule sets 225 to the risk data received over network 205, that a risk issue has arisen for line of business 140C (YES path from 402) and, in some cases, one or more other lines of business 140. In another example, analysis module 224 might not identify a risk issue, such as because the risk data does not match any criteria of rule sets 225, and may continue to monitor subsequently received risk data (NO path from 402).

Computing system 210 may, based on application of the rules, output a request for a response to the issue (403). For example, analysis module 224 causes communication unit 215 to output a signal over network 205. Computing device 141C detects a signal over network 205. Computing device 141C determines that the signal includes information associated with a user interface. Computing device 141C presents a user interface at a display device associated with computing device 141C, prompting a user of computing device 141C for a response to the issue.

Computing system 210 may receive a response to the issue (404). For example, computing device 141C detects input that computing device 141C determines corresponds to an interaction with the user interface presented at computing device 141C. Computing device 141C outputs a signal over network 205. Analysis module 224 of computing system 210 receives an indication of a signal received over network 205 and determines that the signal corresponds to a response to the request (YES path from 404). In the example of FIG. 4, analysis module 224 determines that the response corresponds to one of (1) acceptance of the issue, (2) an indication that the issue has been resolved, or (3) denial of the issue. In some examples, analysis module 224 may determine that no response has been received, and analysis module 224 may send additional requests for a response to computing device 141C to ensure that a response is received and logged (NO path from 404).

If the response indicates that the issue has been accepted, analysis module 224 may transition the issue from a draft issue to an open issue (405). Analysis module 224 may store information about the response or information derived from the response. Analysis module 224 may guide line of business 140C through a predefined plan for resolving the issue.

If the response indicates that the issue was either accepted or resolved, analysis module 224 may eventually determine that the issue has been resolved (YES path from 406). For example, data source module 222 and analysis module 224 may continue to monitor incoming risk data and determine that attributes of the risk data that cause the issue to be raised are no longer present in the risk data. If the issue is resolved, analysis module 224 closes the issue (407). Analysis module 224 may store information about the closed issue.

If the risk data indicates or suggests that the issue has not been resolved, analysis module 224 may escalate the issue (409). For example, analysis module 224 may cause communication unit 215 to output a signal over network 205. Computing device 151 may detect a signal over network 205 and determine that the signal includes information associated with a user interface. Computing device 151 presents user interface 305C at a display device associated with computing device 151, informing a user of computing device 151 about the unresolved issue. In some examples, analysis module may cause communication unit 215 to output additional signals over network 205, thereby escalating the issue to additional users.

Analysis module 224 may modify the set of rules applied to risk data (408). For instance, in some examples, data source module 222 of computing system 210 continues to receive information about risk data after the issue has been closed. Data source module 222 outputs to analysis module 224 information about the risk data. Analysis module 224 determines that the risk data includes information about risk outcomes for previously-identified issues. Analysis module 224 evaluates the risk outcomes in light of the response to the issue received from line of business 140C, the risk data that triggered the issue, any plan for addressing the issue performed by line of business 140C, and other information. Analysis module 224 determines, based on that information, modifications that may be made to rule sets 225 to improve the accuracy of the process for identifying issues, addressing such issues, escalating issues, and/or mitigating any risk events that may arise from such issues. Analysis module 224 modifies rule sets 225 in accordance with the determined modifications.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth above is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in the referenced figures in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A computing system comprising processing circuitry and a storage device, wherein the processing circuitry has access to the storage device and is configured to:

receive risk data;

generate, based on an attribute of the risk data and a set of business operation rules applicable to an entity, an issue relating to a violation of the business operation rules by the entity;

output, to an entity computing device operated by a user authorized by the entity, a request for information about the issue that identifies the issue and requires a user of the entity computing device to respond to the issue through a user interface, and wherein to require the user to respond the issue, the processing circuitry causes the entity computing device to present the user interface so that a response to the issue is chosen from options that include:

an acceptance of the issue, an indication that the issue has been resolved, and a denial of the issue;

responsive to outputting the request, receive information about the issue from the entity computing device, wherein the information a indicates the chosen option is denial of the issue and includes an explanation authored by the entity that pertains to the attribute of the risk data;

receive information about a risk outcome associated with the issue; and modify, based on the information about the issue from the entity computing device and the information about the risk outcome, the set of business operation rules to change circumstances in which the set of business operation rules identify issues.

2. The computing system of claim 1, wherein to output the request for information, the processing circuitry is further configured to:

output a communication to the entity computing device to cause the user interface to be presented by the entity computing device, wherein the user interface prompts a user of the entity computing device to provide a textual response to the issue through the user interface.

3. The computing system of claim 1, wherein to modify the set of business operation rules, the processing circuitry is further configured to:

modify the set of business operation rules, based on the explanation, to avoid generating further issues based on the attribute.

4. The computing system of claim 1, wherein the entity is a first entity, wherein the business operation rules are a first set of business operation rules, wherein the issue is a first issue, and wherein the processing circuitry is further configured to:

generate, based on the risk data and a second set of business operation rules applicable to a second entity, a second issue relating to a violation, by the second entity, of the second set of business operation rules;

output, to an entity computing device controlled by the second entity, a request for information about the second issue;

responsive to outputting the request about the second issue, receive information about the second issue from the entity computing device controlled by the second entity;

receive information about a risk outcome associated with the second issue; and modify, based on the information about the second issue and the information about the risk outcome associated with the second issue, the second set of business operation rules to change circumstances in which the second set of business operation rules identify issues.

5. The computing system of claim 4, wherein to receive the information about the second issue from the entity computing device controlled by the second entity, the processing circuitry is further configured to:
   receive information that includes an acceptance of the second issue by the second entity;
   receive, after receiving the acceptance, further risk data;
   monitor, based on the further risk data, compliance by the second entity with a plan for resolving the second issue; and
   determine, after monitoring compliance, whether the second issue has been resolved.

6. The computing system of claim 5, wherein determining whether the second issue has been resolved includes determining that the second issue has not been resolved, and wherein the processing circuitry is further configured to:
   output an escalation notification.

7. The computing system of claim 4, wherein to receive the information about the second issue from the entity computing device controlled by the second entity, the processing circuitry is further configured to:
   receive information indicating that the second issue is resolved;
   receive, after receiving the information indicating that the second issue is resolved, further risk data; and
   verify, based on the further risk data, that the second issue is resolved.

8. A method comprising:
   receiving, by a computing system, risk data;
   generating, by the computing system and based on an attribute of the risk data and a set of business operation rules applicable to an entity, an issue relating to a violation of the business operation rules by the entity;
   outputting, by the computing system and to an entity computing device operated by a user authorized by the entity, a request for information about the issue that identifies the issue and requires a user of the entity computing device to respond to the issue through a user interface, and wherein to require the user to respond the issue, the processing circuitry causes the entity computing device to present the user interface so that the response to the issue is chosen from options that include:
      an acceptance of the issue,
      an indication that the issue has been resolved, and
      a denial of the issue;
   responsive to outputting the request, receiving, by the computing system, information about the issue from the entity computing device, wherein the information a indicates the chosen option is denial of the issue and includes an explanation authored by the entity that pertains to the attribute of the risk data;
   receiving, by the computing system, information about a risk outcome associated with the issue; and
   modifying, by the computing system and based on the information about the issue from the entity computing device and the information about the risk outcome, the set of business operation rules to change circumstances in which the set of business operation rules identify issues.

9. The method of claim 8, wherein outputting the request for information includes:
   outputting a communication to the entity computing device to cause the user interface to be presented by the entity computing device, wherein the user interface prompts a user of the entity computing device to provide a textual response to the issue through the user interface.

10. The method of claim 8, wherein modifying the set of business operation rules includes:
    modifying the set of business operation rules, based on the explanation, to avoid generating further issues based on the attribute.

11. The method of claim 8, wherein the entity is a first entity, wherein the business operation rules are a first set of business operation rules, wherein the issue is a first issue, and wherein the method further comprises:
    generating, by the computing system and based on the risk data and a second set of business operation rules applicable to a second entity, a second issue relating to a violation, by the second entity, of the second set of business operation rules;
    outputting, by the computing system and to an entity computing device controlled by the second entity, a request for information about the second issue;
    responsive to outputting the request about the second issue, receiving, by the computing system, information about the second issue from the entity computing device controlled by the second entity;
    receiving, by the computing system, information about a risk outcome associated with the second issue; and
    modifying, by the computing system and based on the information about the second issue and the information about the risk outcome associated with the second issue, the second set of business operation rules to change circumstances in which the second set of business operation rules identify issues, and
    wherein receiving the information about the second issue from the entity computing device controlled by the second entity includes:
    receiving information that includes an acceptance of the second issue by the second entity;
    receiving, after receiving the acceptance, further risk data;
    monitoring, based on the further risk data, compliance by the second entity with a plan for resolving the second issue; and
    determining, after monitoring compliance, whether the second issue has been resolved.

12. The method of claim 11, wherein determining whether the second issue has been resolved includes determining that the second issue has not been resolved, the method further comprising:
    outputting an escalation notification.

13. The method of claim 8, wherein the entity is a first entity,
    wherein the business operation rules are a first set of business operation rules, wherein the issue is a first issue, and wherein the method further comprises:
    generating, by the computing system and based on the risk data and a second set of business operation rules applicable to a second entity, a second issue relating to a violation, by the second entity, of the second set of business operation rules;
    outputting, by the computing system and to an entity computing device controlled by the second entity, a request for information about the second issue;
    responsive to outputting the request about the second issue, receiving, by the computing system, information about the second issue from the entity computing device controlled by the second entity;
    receiving, by the computing system, information about a risk outcome associated with the second issue; and modifying, by the computing system and based on the information about the second issue and the information about the risk outcome associated with the second issue, the second set of business operation rules to change circumstances in which the second set of business operation rules identify issues, and wherein receiving the information about the second issue from the entity computing device controlled by the second entity includes:

receiving information indicating that the second issue is resolved;

receiving, after receiving the information indicating that the second issue is resolved, further risk data;

verifying, based on the further risk data, that the second issue is resolved.

14. A non-transitory computer-readable storage medium comprising instructions that, when executed, configure processing circuitry of a computing system to:

receive risk data;

generate, based on an attribute of the risk data and a set of business operation rules applicable to an entity, an issue relating to a violation of the business operation rules by the entity;

output, to an entity computing device operated by a user authorized by the entity, a request for information about the issue that identifies the issue and requires a user of the entity computing device to respond to the issue through a user interface, and wherein to require the user to respond the issue, the processing circuitry causes the entity computing device to present the user interface so that the response to the issue is chosen from options that include:

an acceptance of the issue, an indication that the issue has been resolved, and a denial of the issue;

responsive to outputting the request, receive information about the issue from the entity computing device, wherein the information a indicates the chosen option is denial of the issue and includes an explanation authored by the entity that pertains to the attribute of the risk data;

receive information about a risk outcome associated with the issue; and modify, based on the information about the issue from the entity computing device and the information about the risk outcome, the set of business operation rules to change circumstances in which the set of business operation rules identify issues.

* * * * *